US010186083B1

(12) United States Patent
Gray

(10) Patent No.: US 10,186,083 B1
(45) Date of Patent: *Jan. 22, 2019

(54) METHOD AND SYSTEM FOR NAVIGATING IN PANORAMIC IMAGES USING VOXEL MAPS

(71) Applicant: Google LLC, Mountain View, CA (US)

(72) Inventor: Christopher Gray, Los Gatos, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/662,754

(22) Filed: Jul. 28, 2017

Related U.S. Application Data

(63) Continuation of application No. 14/669,603, filed on Mar. 26, 2015, now Pat. No. 9,754,413.

(51) Int. Cl.
*G06T 19/00* (2011.01)
*H04N 5/232* (2006.01)
*G06T 17/05* (2011.01)

(52) U.S. Cl.
CPC ............ *G06T 19/003* (2013.01); *G06T 17/05* (2013.01); *H04N 5/23238* (2013.01)

(58) Field of Classification Search
None
See application file for complete search history.

(56) References Cited

U.S. PATENT DOCUMENTS

| | | |
|---|---|---|
| 5,594,844 A | 1/1997 | Sakai et al. |
| 5,737,533 A | 4/1998 | de Hond |
| 6,009,190 A | 12/1999 | Szeliski et al. |
| 6,111,582 A | 8/2000 | Jenkins |
| 6,157,747 A | 12/2000 | Szeliski et al. |
| 6,256,043 B1 | 7/2001 | Aho et al. |
| 6,308,144 B1 | 10/2001 | Bronfeld et al. |
| 6,346,938 B1 | 2/2002 | Chan et al. |
| 6,999,078 B1 | 2/2006 | Akerman et al. |
| 7,096,428 B2 | 8/2006 | Foote et al. |
| 7,161,604 B2 | 1/2007 | Higgins et al. |
| 7,336,274 B2 | 2/2008 | Kida |
| 7,353,114 B1 | 4/2008 | Rohlf et al. |
| 7,570,261 B1 | 8/2009 | Edecker et al. |

(Continued)

FOREIGN PATENT DOCUMENTS

| | | |
|---|---|---|
| CN | 101055494 A | 10/2007 |
| CN | 101090460 A | 12/2007 |

(Continued)

OTHER PUBLICATIONS

U.S. Appl. No. 13/414,658, filed Jul. 3, 2012.

(Continued)

*Primary Examiner* — Peter Hoang
(74) *Attorney, Agent, or Firm* — Lerner, David, Littenberg, Krumholz & Mentlik, LLP

(57) ABSTRACT

The present disclosure describes a system and method that includes receiving a user selection of a portion of a first image. In response to the user-selection, a first identifier of three-dimensional space associated with the user-selection is determined and a second image is selected based on a portion of the second image being associated with the first identifier. The second image may be provided to the user to be displayed. The present disclosure also provides for mapping a portion of a first image to an identifier of three-dimensional space.

20 Claims, 7 Drawing Sheets

(56) References Cited

U.S. PATENT DOCUMENTS

| | | |
|---|---|---|
| 7,698,336 B2 | 4/2010 | Nath |
| 7,712,052 B2 | 5/2010 | Szeliski et al. |
| 7,746,376 B2 | 6/2010 | Mendoza et al. |
| 7,843,451 B2 | 11/2010 | Lafon |
| 7,882,286 B1 | 2/2011 | Natanzon et al. |
| 7,933,897 B2 | 4/2011 | Jones et al. |
| 7,966,563 B2 | 6/2011 | VanBree |
| 7,990,394 B2 | 8/2011 | Vincent et al. |
| 8,072,448 B2 | 12/2011 | Zhu et al. |
| 8,319,952 B2 | 11/2012 | Otani et al. |
| 8,392,354 B2 | 3/2013 | Salemann |
| 8,447,136 B2 | 5/2013 | Ofek et al. |
| 8,525,825 B2 | 9/2013 | Zhu et al. |
| 8,525,834 B2 | 9/2013 | Salemann |
| 8,587,583 B2 | 11/2013 | Newcombe et al. |
| 8,624,958 B2 | 1/2014 | Mendoza et al. |
| 8,774,950 B2 | 7/2014 | Kelly et al. |
| 8,818,076 B2 | 8/2014 | Shenkar et al. |
| 2002/0070981 A1 | 6/2002 | Kida |
| 2003/0063133 A1 | 4/2003 | Foote et al. |
| 2004/0196282 A1 | 10/2004 | Oh |
| 2004/0257384 A1 | 12/2004 | Park et al. |
| 2005/0073585 A1 | 4/2005 | Ettinger et al. |
| 2005/0128212 A1 | 6/2005 | Edecker et al. |
| 2005/0210415 A1 | 9/2005 | Bree |
| 2006/0004512 A1 | 1/2006 | Herbst et al. |
| 2006/0050091 A1 | 3/2006 | Shoemaker et al. |
| 2006/0132482 A1 | 6/2006 | Oh |
| 2006/0271280 A1 | 11/2006 | O'Clair |
| 2007/0030396 A1 | 2/2007 | Zhou et al. |
| 2007/0070069 A1 | 3/2007 | Samarasekera et al. |
| 2007/0076920 A1 | 4/2007 | Ofek |
| 2007/0143345 A1 | 6/2007 | Jones et al. |
| 2007/0208719 A1 | 9/2007 | Tran |
| 2007/0210937 A1 | 9/2007 | Smith et al. |
| 2007/0250477 A1 | 10/2007 | Bailly |
| 2007/0273558 A1 | 11/2007 | Smith et al. |
| 2007/0273758 A1 | 11/2007 | Mendoza et al. |
| 2008/0002916 A1 | 1/2008 | Vincent et al. |
| 2008/0033641 A1 | 2/2008 | Medalia |
| 2008/0106593 A1 | 5/2008 | Arfvidsson et al. |
| 2008/0143709 A1 | 6/2008 | Fassero et al. |
| 2008/0268876 A1 | 10/2008 | Gelfand et al. |
| 2009/0132646 A1 | 5/2009 | Yang et al. |
| 2009/0279794 A1 | 11/2009 | Brucher et al. |
| 2009/0315995 A1 | 12/2009 | Khosravy et al. |
| 2010/0076976 A1 | 3/2010 | Sotirov et al. |
| 2010/0250120 A1 | 9/2010 | Waupotitsch et al. |
| 2010/0257163 A1 | 10/2010 | Ohazama et al. |
| 2010/0305855 A1 | 12/2010 | Dutton et al. |
| 2011/0137561 A1 | 6/2011 | Kankai Nen |
| 2011/0202492 A1 | 8/2011 | Salemann |
| 2011/0254915 A1 | 10/2011 | Vincent et al. |
| 2011/0270517 A1 | 11/2011 | Benedetti |
| 2011/0283223 A1 | 11/2011 | Vaittinen et al. |
| 2014/0152699 A1 | 6/2014 | Oh |
| 2014/0160119 A1 | 6/2014 | Vincent et al. |
| 2014/0294263 A1 | 10/2014 | Hermosillo Valadez et al. |
| 2015/0154796 A1 | 6/2015 | Co |
| 2016/0148413 A1 | 5/2016 | Oh |

FOREIGN PATENT DOCUMENTS

| | | |
|---|---|---|
| GB | 2440197 A | 1/2008 |
| JP | 2004342004 A | 12/2004 |
| JP | 2005250560 A | 9/2005 |
| JP | 2008520052 A | 6/2008 |
| WO | 2006053271 A1 | 5/2006 |
| WO | 2007044975 A2 | 4/2007 |
| WO | 2008147561 A2 | 12/2008 |

OTHER PUBLICATIONS

International Preliminary Report on Patentability, dated Sep. 10, 2010, International Patent Application No. PCT/US2009/001216, The International Bureau of WIPO, Geneva, Switzerland, 11 pages.

Notification of the First Office Action, dated Mar. 30, 2012, Chinese Patent Application 200980114885.5, The State Intellectual Property Office of the People's, Republic of China, 7 pages (English language translation appended).

Notification of the Third Office Action, dated Feb. 25, 2013, Chinese Patent Application 2009801148855, The State Intellectual Property Office of the People's Republic of China, 7 pages (English language translation appended).

First Office Action, dated Apr. 1, 2013, Japanese Patent Application No. 2010-548720, Japanese Patent Office, 7 pages (English language translation appended).

The State Intellectual Property Office of the People'S Republic of China, "Notification of the Second Office Action," Appln. No. 200980114885.5, dated Sep. 12, 2012, pp. 1/52-10/52 (English language translation provided—pp. 1-15).

Yang, Yang, "Research on the Virtual Reality Technology of Digital Tour System," Chinese Master's Theses Full-Text Database Information Science and Technology, Issue 5, Nov. 15, 2007, pp. 12/52-39/52.

Cobzas et al., "A Panoramic Model for Remote Robot Environment Mapping and Predictive Display," Published 2005.

Kulju et al., "Route Guidance Using a 3D City Mobile Device," Published 2002.

Kimber, et al., "FlyAbout: Spatially Indexed Panoramic Video," Proceedings of the ninth ACM international conference on Multimedia; 2001; pp. 339-347.

Lowe et al.; "Fitting Parameterized Three-Dimensional Models to Images," IEEE Transactions on Pattern Analysis and Machine Intelligence, 13, 5, May 1991; pp. 441-450.

Bay et al., "SURF: Speeded Up Robust Features;" Computer Vision—European Conference on Computer Vision 2006; Jul. 26, 2006; pp. 1-14.

Zhu et al., U.S. Appl. No. 12/014,513, filed Jan. 15, 2008, entitles Three-Dimensional Annotations for Street View Data.

Kadobayashi, R., et al., "Combined Use of 2D Images and 3D Models for Retrieving and Browsing Digital Archive Contents", Videometrics VIII, Proceeding of the SPIE—The International Society of Optical Engineering, San Jose, CA, 2005, 10 pages.

International Search Report and Written Opinion for International Patent Application PCT/US2009/001216, European Patent Office, Netherlands, completed Sep. 8, 2009, dated Sep. 21, 2009, 20 pages.

Snavely, Noah et al., "Photo tourism: Exploring Photo Collections in 3D," ACM Transactions on Graphics (SIGGRAPH Proceedings), 25 (3), 2006, pp. 835-846.

Web Archive Capture (Feb. 26, 2008), <http://phototour.cs.washington.edu/>.

Wei et al., "A Panoramic Image-Based Approach to Virtual Scene Modeling," Oct. 2006.

Cornells et al. "3D Urban Scene Modeling Integrating Recognition and Reonctruction," published Oct. 2007.

Xu Huaiyu et al: "A Virtual Community Building Platform Based on Google Earth", Hybrid Intelligent Systems, 2009. HIS '09. Fifth International Conference on, IEEE, Piscataway, NJ, USA, Aug. 12, 2009, pp. 349-352, XP031529801.

Notification of First Office Action for Chinese Patent Application No. 201310473478.1 dated Mar. 3, 2016.

Frueh et al. "Data Processing Algorithms for Generating Textured 3D Building Façade Meshes from laser Scans and Camera Images", Published 2004.

METHOD AND SYSTEM FOR NAVIGATING IN PANORAMIC IMAGES USING VOXEL MAPS

CROSS-REFERENCE TO RELATED APPLICATIONS

The present application is a continuation of U.S. patent application Ser. No. 14/669,603, filed Mar. 26, 2015, the disclosure of which is incorporated herein by reference.

BACKGROUND

When viewing imagery, such as images of a geographic location, users are limited to imagery that has been previously stored in association with the viewed image. For example, if the user desires to see a different aspect of the geographical location, subsequent images may be determined based on an image-based identifier. In this regard, the subsequent images may or may not focus on the aspect the user desires to view.

BRIEF SUMMARY

The present disclosure describes interconnecting imagery using spatial identifiers. In this regard, an image may include a plurality of spatial identifiers that identify a geographic space associated with objects and features included in the image. The spatial identifiers may be used to retrieve and select additional images when a user clicks on a portion of the image associated with the geographic position identified by the spatial identifier.

One aspect of the disclosure describes a system that includes one or more computing devices and a memory. The memory stores instructions and data, such as a plurality of images. A portion of each of the plurality of images may include an object, and the portion may be associated with an identifier of a range of three-dimensional space that contains at least a portion of the surface of such object.

The one or more computing devices may be programmed to receive a user selection of a portion of a first image of the plurality of images. The one or more computing devices may then determine a first identifier of three-dimensional space associated with the user-selection and select a second image based on a portion of the second image being associated with the first identifier. The one or more computing devices may subsequently provide the second image for display to the user.

According to some examples, the user selection may include clicking on the first portion of the first image. In some examples, the first portion may be a pixel of the first image.

In some examples, the one or more computing devices may be programmed to create a scored listing of the plurality of images associated with the first identifier and select the second image from the scored listing.

In another example, the first identifier may represent a three-dimensional representation of space in a hierarchical tree of space, such as a voxel.

Another aspect of the disclosure provides a method that includes receiving a user selection of a portion of a first image, determining a first identifier of three-dimensional space associated with the user-selection, selecting a second image from a plurality of images based on a portion of the second image being associated with the first identifier, and providing the second image for display to the user. In this regard, the user selection may include clicking on the first portion of the first image. In some examples, the first portion may include a pixel or a subset of pixels.

In one example, the method may include creating a scored listing of the plurality of images associated with the first identifier and selecting the second image from the scored listing of the plurality of images.

According to other examples, the first identifier may represent a three-dimensional representation of space in a hierarchical tree of space. For example, the three-dimensional space may be a voxel.

A further aspect of the disclosure provides a system for mapping a portion of a first image to an identifier of three-dimensional space. The system may include one or more computing devices and a memory that stores instructions and data, such as a plurality of images.

The one or more computing devices may be programmed to generate a plurality of spatial identifiers. Each of the spatial identifiers may identify a range of three-dimensional space that contains the surface of an object represented by a three-dimensional model. In this regard, the one or more computing devices may be programmed to determine, for a first image captured from a first location, a first ray extending in three-dimensional space from a first location through a first portion of a first image. The one or more computing devices may then determine a first spatial identifier associated with the range of three-dimensional space that contains the intersection of the first ray with the three-dimensional model of the object and associate the first portion of the first image with the first spatial identifier.

In some examples, the one or more computing devices may be further programmed to determine, for a second image captured from a second location, a second ray extending in three-dimensional space from the second location through a second portion of a second image and determine a second spatial identifier associated with the range of three-dimensional space that contains the intersection of the second ray with the three-dimensional model of the object. The one or more computing devices may then associate the second portion of the second image with the first spatial identifier when the first spatial identifier and second spatial identifier identify the same range of three-dimensional space. According to some examples, the three-dimensional space may be a voxel.

Another aspect of the disclosure describes a method for mapping a portion of a first image to an identifier of three-dimensional space that includes generating a plurality of spatial identifiers. The method may then determine, for a first image captured from a first location, a first ray extending in three-dimensional space from the first location through a first portion of a first image and determine a first spatial identifier associated with the range of three-dimensional space that contains the intersection of the first ray with the three-dimensional model of the object. The method may then associate the first portion of the first image with the first spatial identifier. In some examples, each spatial identifier may identify a range of three-dimensional space that contains the surface of an object represented by a three-dimensional model.

The method may further include determining, for a second image captured from a second location, a second ray extending in three-dimensional space from the second location through a second portion of a second image. Accordingly, the method may determine a second spatial identifier associated with the range of three-dimensional space that contains the intersection of the second ray with the three-dimensional model of the object and associate the second portion of the second image with the first spatial identifier when the first spatial identifier and second spatial identifier identify the same range of three-dimensional space.

DETAILED DESCRIPTION

Figure 1:
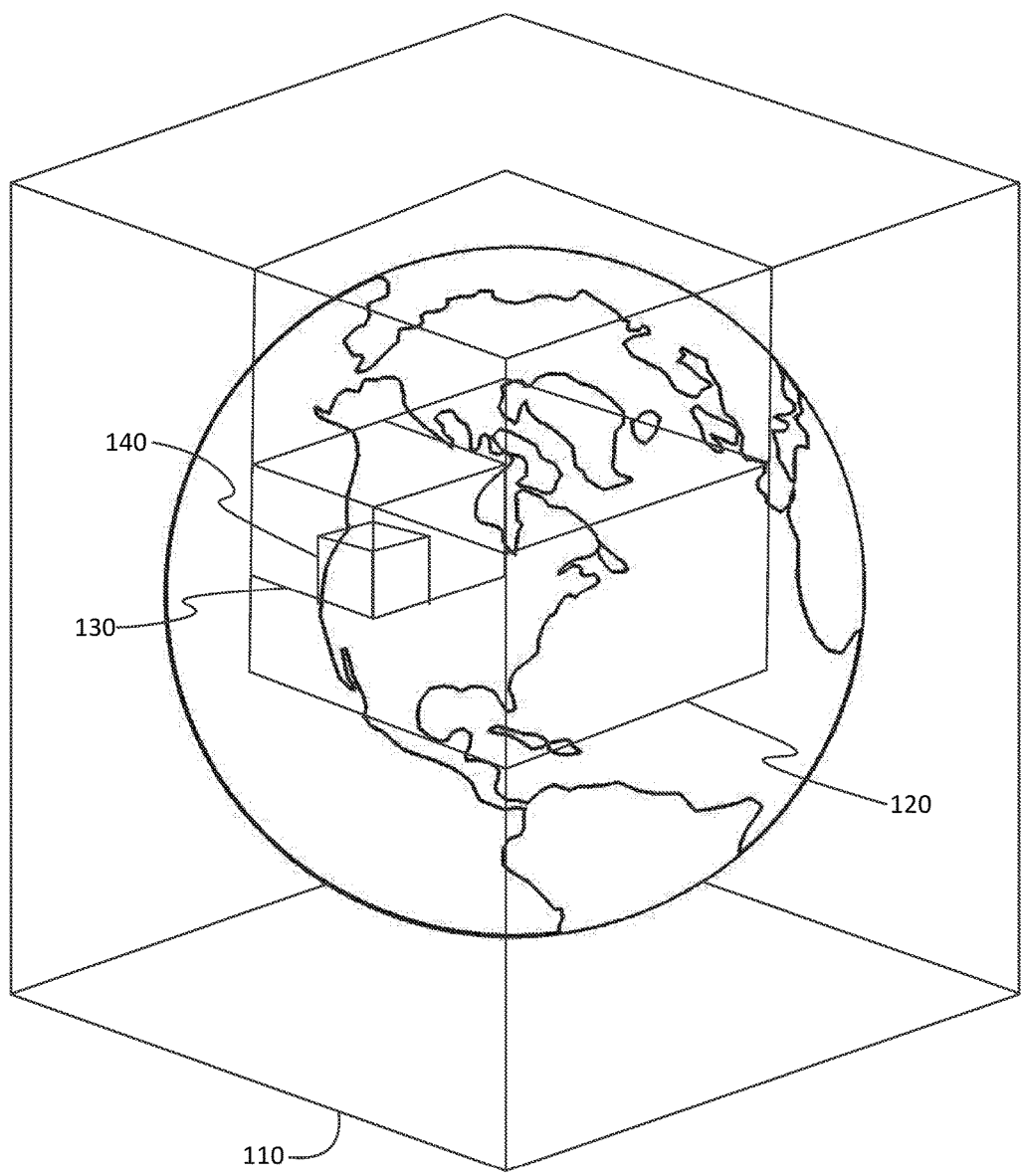
FIG. 1 illustrates a decomposition of space into a tree of hierarchical 3-dimensional shapes.

The present technology relates to, among other things, interconnecting imagery based on a three-dimensional (3-D) model of the geographic position of features in the image. For example, spatial identifiers may be used to identify a geographic space associated with objects and features included in an image. As such, the spatial identifiers may be used to retrieve and select additional images when a user clicks on a portion of the image associated with the geographic position identified by the spatial identifier, thereby providing interconnectivity between multiple images.

In this regard, a system may include one or more computing devices that use the 3-D knowledge associated with each image to make a determination of which images should be interconnected. For example, a server may decompose space into an octree that breaks down physical space into a tree of hierarchical cubes, each cube being referred to herein as a "voxel." The root of the octree may be a single cube with each cube having various children. In order to identify each of the children, an arbitrary order may be assigned to the children cubes.

In addition, images may be associated with a voxel map. A voxel map may include a panoramic or flat image where the pixels of an image have been mapped to voxels. For example, each pixel of an image may be associated with a voxel identifier. To create the voxel map for an image, a 3-D model of the world is created. Once the 3-D model of the world is obtained, a ray is extended from the location of the camera through a pixel of the image to the 3-D model. The voxel identifier where the ray intersects the 3-D model is mapped to the pixel such that each pixel in the image is mapped to at least one voxel identifier. The pixel/voxel mapping may be stored in a database.

Multiple images of the same geographic location may thus include pixels that have been mapped to the same voxel identifier that identifies the same geographic space of a 3-D model. In this regard, the voxel identifier may be used to interconnect a plurality of images that identify a geographic space associated with the same objects and features included in different images, thereby interconnecting the different images via the voxel identifier. Interconnecting may be performed, for example, dynamically in response to receiving a user request, prior to providing the first image for display to the user, or at any other time. Accordingly, voxel identifiers may be used to retrieve additional images when a user clicks on a portion of the image associated with the geographic position identified by the spatial identifier.

After the voxel map has been created, a user may interact with the voxel map. For example, a user may view an image (e.g., spherical panoramic or flat image) using, for example, an application, web browser, or mobile app. The user may click on a pixel of the image and the system may determine the voxel identifier associated with that pixel. The system may then identify a plurality of images that also include the voxel identifier and select a second image from the plurality of images to provide to the user. In some examples, the selection may be based on a scored listing of the plurality of images. The second image may then be displayed for the user to interact with in the manner described above.

FIG. 1 illustrates an example of a decomposition of space into a tree of hierarchical 3-dimensional shapes. In particular, FIG. 1 shows an octree that breaks down 3-dimensional space into a tree of hierarchical cubes. The root cube 110 of the octree may be a single cube. According to one example, the root cube may encompass the earth and have a side length of approximately $2^{23}$ meters. The root cube 110 may be split in half by planes that are parallel to the root cube's sides to form 8 children cubes. Child cube 120 may represent the upper-front-right cube of the 8 children cubes derived from root cube 110.

Accordingly, the cubes may be further split in half to form 8 grandchildren cubes. For example, cube 130 may represent a grandchild cube of root cube 110 and cube 140 may represent a great-grandchild cube of root cube 110. The process may be repeated any number of times. According to one example, the octree represented in FIG. 1 may have up to 26 levels, with cubes at the lowest level having a side length of about ⅛ meters. This would produce approximately $3.0 \times 10^{23}$ cubes. While cubes are referred to herein, one of ordinary skill in the art would recognize that other three-dimensional shapes, such as prisms, dodecahedrons, etc., could be used.

Figure 2A:
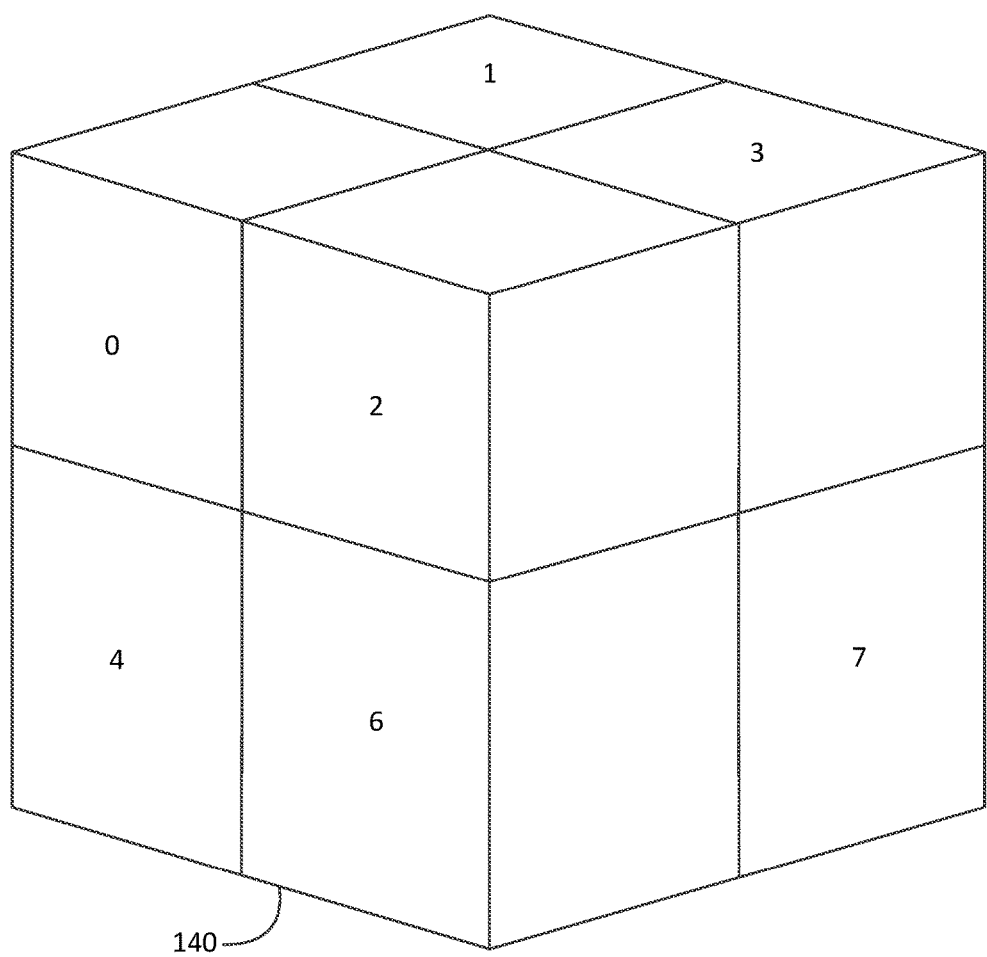
FIGS. 2A and 2B shows an example of how the space is decomposed into smaller 3-dimensional shapes.
Figure 2B:
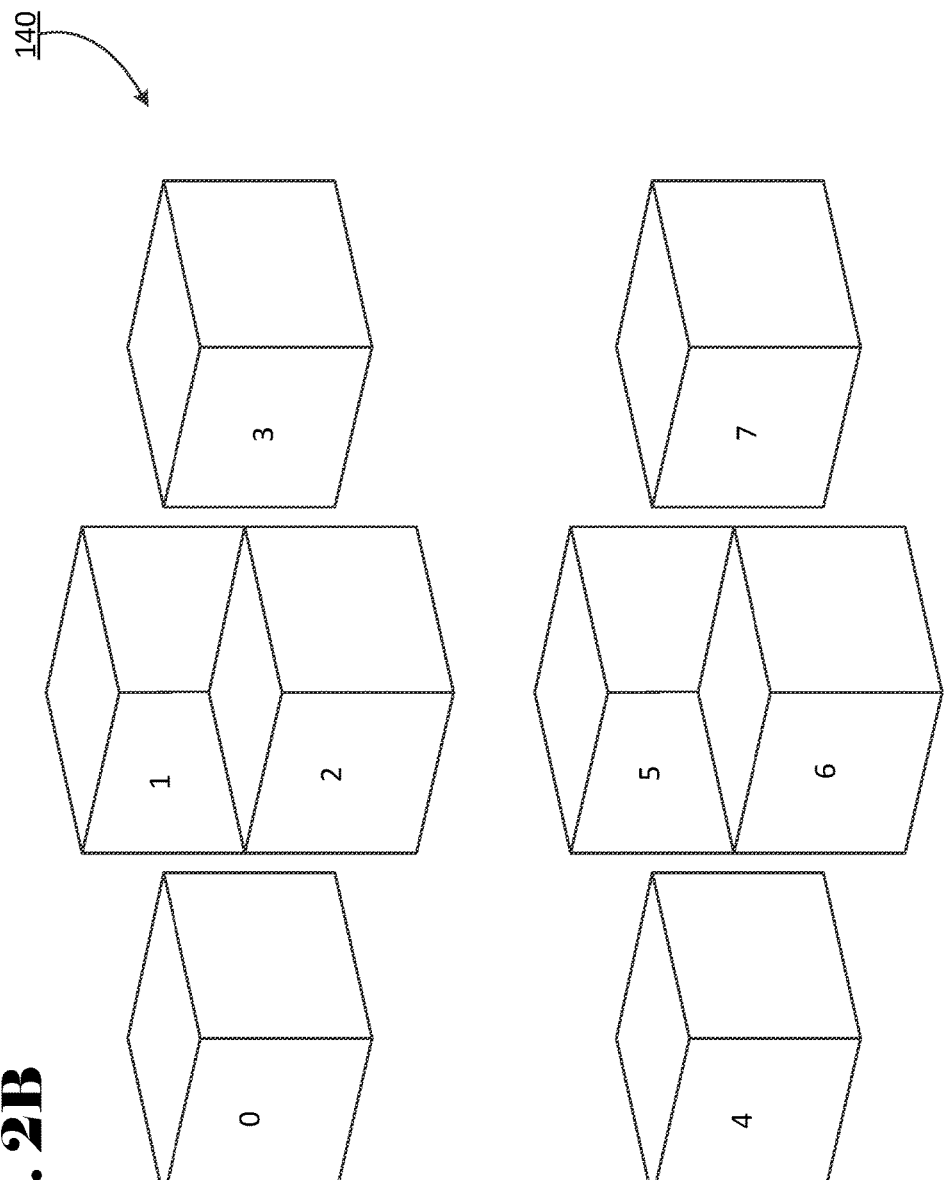

FIGS. 2A and 2B illustrate an example of assigning an order to the children cubes in order to identify each of the children cubes. FIGS. 2A and 2B depict the division of great-grandchild cube 140 into 8 cubes. In this regard, the upper-front-left child cube may be 0, the back-front-left child cube may be 1, the upper-front-right child cube may be 2, and so on and so forth. For example, cube 120 in FIG. 1 may be identified as an upper-front-right child cube and would be assigned the identifier two (2). Further, cube 130 may be assigned zero (0) since cube 130 may be identified as an upper-front-left child cube of cube 120. Accordingly, cube 130 may be assigned an identifier of 20. Alternatively, cube 130 may be identified in binary as 010000. Accordingly, each of the approximately $3.0 \times 10^{23}$ cubes may be assigned a 78 bit spatial identifier that identifies the location of the cube in the octree and, overall, in the decomposed space. The 78 bit spatial identifier may also be known as a voxel identifier.

Figure 3:
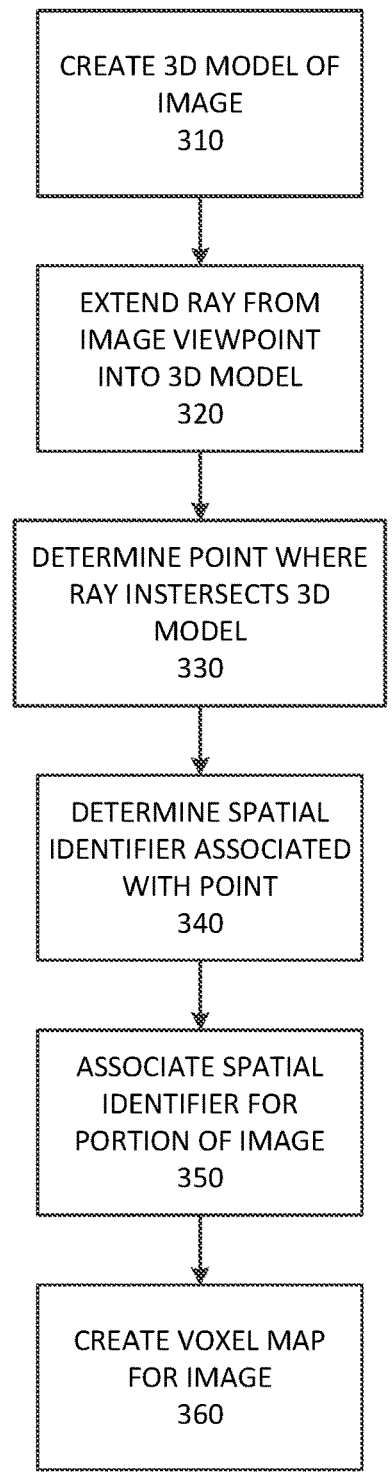
FIG. 3 illustrates a flowchart for associating a portion of an image with a spatial identifier.

FIG. 3 illustrates an example flowchart for generating a voxel-map for an image. As noted above, a voxel map is an image, such as a panoramic, spherical panoramic, or flat image, where the pixels of the image have been mapped to a location in a three-dimensional model. For example, each pixel of an image may be associated with a spatial identifier. While the operations of FIG. 3 are discussed in a particular order, it should be understood that the order may be varied. Similarly operations may be performed simultaneously, and operations may be added or omitted.

In block 310, one or more computing devices may obtain an image, such a panoramic, spherical panoramic, or a flat image, and create a 3-D model of the image. According to one example, the one or more computing devices may generate a 3-D model of an image. In this regard, a 3-D model for an image may be generated by identifying one or more layers of an environment based on a plurality of 3-dimensional points mapping the environment. Next, a layout that represents a 2-dimensional model of the geographic environment may be generated for each layer. Finally, a 3-D model of the geographic environment may be generated based on the 2-dimensional model of each layout.

According to another example, creating a 3-D model from image data may include selecting a plurality of images from approximately the same location. For example, a plurality of images of the same location captured from different perspectives may be selected. Next, features from the plurality of images may be extracted. Features common to the plurality of images may be matched, and, based on the common features, a point in three-dimensional space for each pair of matched features may be determined. For instance, a ray may be formed or determined for each feature, and a point may be determined based on the intersection of the rays. Accordingly, a number of three-dimensional points may be outputted and used to determine the three-dimensional shapes in the image using a best-fit or regression analysis algorithm, such as a least-squares or an adaptive optimization algorithm.

The techniques for creating a 3-D model described above are merely illustrative. One of ordinary skill would recognize that other techniques could be used, including, for example, a laser-based system that utilizes lasers to generate intensity information for objects and uses this information to determine spatial relationships between points on the surfaces of objects may also be used to generate a 3-D model of those objects and the surrounding spaces.

In block 320, a ray may be extended from the camera viewpoint through a portion of the image into the 3-D model created in block 310. According to some examples, the portion of the image may be a pixel or a subset of pixels. Additionally, extending ray from a viewpoint into the 3-D model may be performed for a large, regularly-sampled, subset of pixels in the image.

Next, the point where the ray intersects the 3-D model may be determined in block 330. Accordingly, a spatial identifier, such as a voxel identifier, may be determined based on the location where the ray intersects the 3-D model in block 340. In block 340, the spatial identifier may be associated with the portion of the image where the ray intersects the image. Associating the spatial identifier with the portion of the image may include, for example, mapping the portion of the image to the spatial identifier in a table or database.

In some examples, the operations performed in FIG. 3 may be repeated for the remaining portions of an image. In other examples, the operations may be repeated for objects in the images. That is, the operations illustrated in FIG. 3 may not be performed on certain areas, such as depictions of sky. After all the portions of the image have been analyzed, one or more computing devices may create a voxel map for the image in block 360.

The flowchart depicted in FIG. 3 may be performed for a plurality images. In this regard, different images, taken from different viewpoints, may identify the same range of space. In this regard, a second image may include a voxel map that shares one or more spatial identifiers with the first image. As noted above, the spatial identifiers that identify the same geographic space may be used to retrieve additional images. For example, when a user clicks on a portion of the image associated with a geographic position identified by the spatial identifier, one or more images associated with the spatial identifier may be retrieved providing interconnectivity between images. Shared spatial identifiers may provide the system greater flexibility about which images to select and provide to the user as described in greater detail below.

Figure 4:
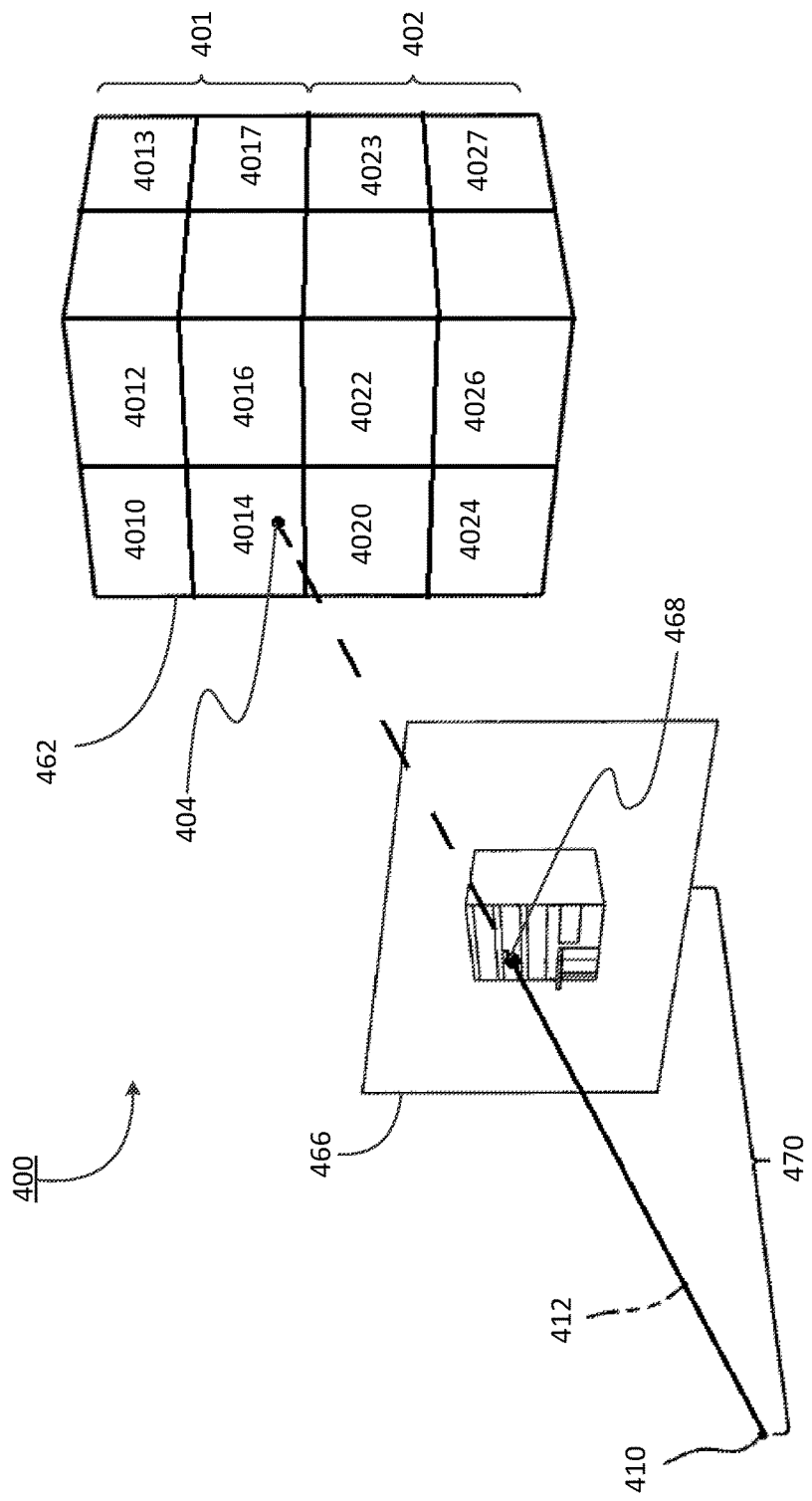
FIG. 4 illustrates an example of associating a portion of an image with a spatial identifier.

FIG. 4 is a diagram that shows an example of how a portion of an image is associated with a spatial identifier. Diagram 400 shows an image 466 and a 3-D model that includes building 462. The 3-D model may be generated using image content, as described above.

Image 466 may be a portion of a panoramic image, a spherical panoramic image, or a flat image displayed to a user through a viewport. The viewport may be a web browser, a plug-in for a web browser, an application, or a mobile app Image 468 may include a point 468. In some examples, the point 468 may be a point where ray 412 extends from camera viewpoint 410 through image 466 into the 3-D model. In other examples, such as a user selection environment, point 468 may be selected by a user using an input device, such as a mouse. In some examples, one or more computing devices may automatically extend a ray through the image 466 into the 3-D model from the viewpoint 410 for each pixel. In this regard, the one or more computing devices may associate each pixel of image 466 with a spatial identifier in the 3-D model.

According to one example, camera viewpoint 410 may be the focal point of the camera used to take photographic image 466. In this regard, the distance between image 466 and camera viewpoint 410 is focal length 470.

The 3-D model may include building 462. Building 462 may be represented by a first cube 401 and a second cube 402. The first cube 401 may be divided into eight child cubes (4010, 4011 (not shown), 4012, 4013, 4014, 4015 (not shown), 4016, and 4017). Similarly, the second cube 402 may also be divided into eight child cubes (4020, 4021 (not shown), 4022, 4023, 4024, 4025 (not shown), 4026, and 4027). The plurality of child cubes identify a range of three-dimensional space associated with at least a portion of a surface of building 462.

Point 404 may represent the intersection between ray 412 and 3-D model. As shown in FIG. 4, point 404 falls within cube 4014. Accordingly, the point 468 in image 466 may be associated with cube 4014. That is, point 468 may be associated with the spatial identifier associated with cube 4014. Accordingly, point 468 in image 466 may connect to other images that depict cube 4014, thereby allowing a user to navigate between different images of a space taken from different viewpoints, distances, and/or angles. Thus, when a user selects point 468 in image 466, one or more images associated with the spatial identifier of cube 4014 would be retrieved, one of which would be selected to be displayed as the next image with which the user could interact.

Figure 5:
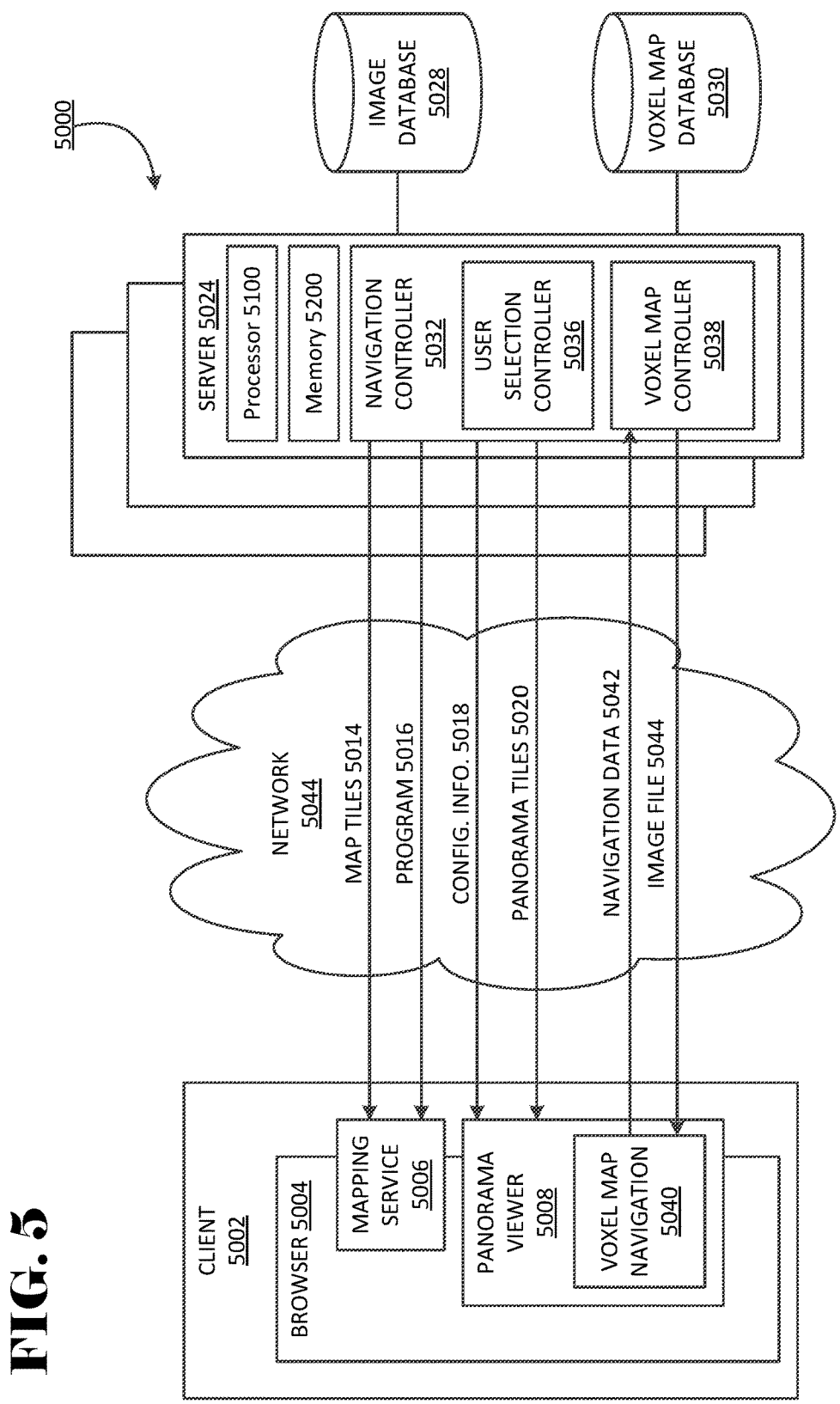
FIG. 5 shows a system for using a 3-dimensional model to navigate within an image according to one aspect of the disclosure.

FIG. 5 shows a system 5000 for navigating within an image according to an example of the disclosure. As shown in FIG. 5, system 5000 includes a client 5002. Client 5002 communicates with one or more servers 5024, for example, across network 5044. Client 5002 may be a computer, such as a desktop or laptop computer, a mobile telephone, a smart phone, a tablet, a phablet, or any other type of portable computing device.

Server 5024 may be implemented using any computing device capable of serving data to client 5002. For example, server 5024 may be any type of server, including a server in a server farm or data center or a web server. In this regard, a web server is a software component that responds to a hypertext transfer protocol (HTTP) request with an HTTP reply.

Server 5024 may include a processor 5100 and memory 5200 communicatively coupled to each other. The processor 5100 may be any conventional processor, such as processors from Intel Corporation or Advanced Micro Devices. Alternatively, the processor may be a dedicated controller such as an application specific integrated circuit (ASIC), field programmable gate array (FPGA), etc. Additionally, the processor 5100 may include multiple processors, multi-core processors, or a combination thereof. Accordingly, references to a processor will be understood to include references to a collection of processors or dedicated logic that may or may not operate in parallel.

The memory 5200 stores information accessible by the processor 5100, including instructions and data that may be executed or otherwise used by the processor. In this regard, memory 5200 may be of any type capable of storing information accessible by the processor, including a non-transitory computer-readable medium, or other medium that stores data that may be read with the aid of an electronic device, such as a hard-drive, memory card, flash drive, ROM, RAM, DRAM, DVD or other optical disks, as well as other write-capable and read-only memories. In that regard, memory may include short term or temporary storage as well as long term or persistent storage. Alternatively, the memory 5200 may include a storage area network (SAN) capable of being accessed by server 5024. Systems and methods may include different combinations of the foregoing, whereby different portions of the instructions and data may be stored on different types of media.

The instructions stored in memory 5200 may be any set of instructions to be executed directly (such as machine code) or indirectly (such as scripts) by the processor 5100. For example, the instructions may be stored as computer code on the computer-readable medium. In that regard, the terms "instructions," "modules," and "programs" may be used interchangeably herein. The instructions may be stored in object code format for direct processing by the processor, or in any other computer language including scripts or collections of independent source code modules that are interpreted on demand or compiled in advance. The instructions may be executed to, for example, receive a user selection of a portion of a first image, determine a first identifier of three-dimensional space associated with the user-selection, select a second image from a plurality of images based on a portion of the second image being associated with the first identifier, and provide the second image for display to the user. Alternatively, the instructions may be executed to map a portion of a first image to an identifier of three-dimensional space that includes generating a plurality of spatial identifiers, determining a first ray extending in three-dimensional space from the first location through a first portion of a first image, determining a first spatial identifier associated with the range of three-dimensional space that contains the intersection of the first ray with the three-dimensional model of the object, and associating functions, methods and routines of the instructions are explained in more detail below.

The data stored in memory 5200 may be retrieved, stored or modified by processor 5100 in accordance with the instructions described above. For instance, although the system and method are not limited by any particular data structure, the data may be stored in computer registers, in a relational database as a table having a plurality of different fields and records, XML documents, or flat files. The data may also be formatted in any computer-readable format. The data may comprise any information sufficient to identify the relevant information, such as numbers, descriptive text, proprietary codes, references to data stored in other areas of the same memory or different memories (including other network locations) or information that is used by a function to calculate the relevant data. The data may include, for example, panoramic images, flat files, map tiles, and identifier information, such as voxel identifiers.

Network 5044 can be any network, or combination of networks, that can carry data communications, and may be referred to herein as a computer network. The network 5044 may comprise various configurations and use various protocols including the Internet, World Wide Web, intranets, virtual private networks, a cable network, a satellite network, local Ethernet networks, private networks using communication protocols proprietary to one or more companies, cellular and wireless networks (e.g., WiFi), data center networks, and various combinations of the foregoing. Intermediate web servers, gateways, or other servers may be provided between components of system 5000 depending upon a particular application or environment.

Server 5024 may provide map tiles 5014, a program 5016, configuration information 5018, and/or panorama tiles 5020 as discussed in greater detail below. Additionally, server 5024 may be coupled to an image database 5028 and voxel map database 5030. Image database 5028 may store images, such as panoramic images, spherical panoramic images, flat images, user generated content, etc. Voxel map database 5030 may store a three-dimensional model, as described above, corresponding to the plurality of images in panorama database 5028. Further, voxel map database 5030 may store a plurality of spatial identifiers that identify a range of three-dimensional space associated with at least a portion of a surface of an object of an image stored in the image database 5028. An example of how the three-dimensional model may be generated is discussed in further detail above.

Server 5024 may also include a navigation controller 5032. Navigation controller 5032 may use a 3-D model in voxel map database 5030 generated from image content to facilitate navigation between images. Navigation controller 5032 may receive input from a client device via navigation data 5042. Navigation data 5042 may contain data about the present position and orientation and data about the desired next position. For example, navigation data 5042 may contain a first image and an identifier from the first image where the user would like to go. The identifier may be either an image identifier or a spatial identifier associated with the voxel map location associated with a portion of the first image that the user selected.

In response to navigation data 5042, navigation controller 5032 determines a plurality of images in image database 5028 associated with the received spatial identifier. In this regard, navigation controller 5032 may determine a second image from the plurality of images to provide to the user in response to the received spatial identifier. Additionally, navigation controller 5032 may determine the orientation of the second image based on the configuration information 5018 and panorama tiles 5020. The navigation controller 5032 may provide the second image via image file information 5044. Alternatively, the image file information 5044 may include an identifier indicating to the client device 5002 which image to display as the second image.

Navigation controller 5032 may include a user selection controller 5036 and a voxel map controller 5038. Each of user selection controller 5036 and voxel map controller 5038 responds to navigation data 5042 according to an example of the present disclosure.

User selection controller 5036 may allow a user to navigate to a second image at a different location according to a user-selection of an object in the first image. That is, in response to receiving navigation data 5042, user selection controller 5036 may select a second image to provide to the client based on an image spatial identifier received from the client device 5002. The image identifier may be determined by a user input, such as a mouse click. User selection controller 5036 may use the image identifier associated with a portion of the first image to determine a location in the 3-D model in voxel map database 5042, as described above. User selection controller 5036 may then retrieve a second image based upon the image identifier received from the client device and provide the second image to the client device.

In some examples, user selection controller 5036 may select the second image based on the orientation of the second image. In this regard, the second image may be selected because the second image may be oriented to face the location in the model or the second image may be oriented in the direction of the view point. After selecting the second image, user selection controller 5036 returns the second image to the user in panorama tiles 5020 and its orientation in configuration information 5018.

Voxel-map controller 5038 may retrieve a plurality of images that have the spatial identifier provided by the client device in navigation data 5042. In this regard, voxel-map controller may select a second image from the plurality of retrieved images that have the received spatial identifier. According to some examples, the second image may be selected based on a position in navigation data 5042 entered by a user. In this regard, voxel-map controller 5038 may determine a location in the model in voxel map database 5030 according to the spatial identifier received in navigation data 5042. Accordingly, voxel-map controller 5038 may retrieve a plurality of images associated with the determined location. Based on the location and the orientation of the first image, the voxel-map controller may select a second image from the plurality of retrieved images and return the second image in panorama tiles 5020 and the orientation of the second image in configuration information 5018.

According to other examples, the voxel map controller 5038 may create a scored listing of the plurality of retrieved images that include the received spatial identifier. Accordingly, the user selection controller 5036 may select a second image to provide to the user based on the scored listing of the plurality of retrieved images.

In an example, client 5002 may include or access mapping service 5006 and panorama viewer 5008. Each of mapping service 5006 and panorama viewer 5008 may be a stand-alone application or may be executed within a browser 5004. The browser 5004 may be any suitable web browser capable of accessing the World Wide Web. Panorama viewer 5008, for example, can be executed as a script within browser 5004, as a plug-in within browser 5004, or as a program which executes within a browser plug-in. Accordingly, the user of the client device may interact with the mapping service 5006 and the panorama viewer 5008 according to known techniques.

For example, mapping service 5006 may display a visual representation of a map as a viewpoint into a grid of map tiles. Mapping service 5006 may be implemented using a combination of markup and scripting elements. As the viewpoint is moved, mapping service 5006 may request additional map tiles 5014 from server 5024. In this regard, the server which serves map tiles 5014 may be the same or a different server from the server that serves panorama tiles 5020, configuration information 5018, or the other data described herein.

In an example, mapping service 5006 can request that browser 5004 proceed to download a program 5016 for a panorama viewer 5008 from server 5024 and to instantiate any plug-in necessary to run program 5016. Program 5016 may be any type of file capable of executing content. Panorama viewer 5008 may execute and operate according to program 5016.

For example, panorama viewer 5008 may request configuration information 5018 from server 5024. The configuration information may include meta-information about an image to be loaded. In an example, the configuration information is presented in a form such as the Extensible Markup Language (XML). Panorama viewer 5008 may retrieve a plurality of panorama tiles 5020 to be displayed on the client device 5002. Panorama tiles 5020, may include, panoramic images, spherical panoramic images, or flat image files. Accordingly, panorama viewer 5008 may provide the plurality of panorama tiles 5020 as a visual representation on the client display. The panorama viewer 5008 may also provide and additional user interface elements, as generated from configuration information 5018 and panorama tiles 5020. In this regard, as a user interacts with an input device to manipulate the visual representation of the image displayed on the client device 5002, panorama viewer 5008 may update the visual representation and proceed to download additional configuration information and images as needed.

For example, panorama viewer 5008 may display a spherical panoramic image of New York harbor. The display may also include navigation controls, zoom in, zoom out, audio controls, etc. Accordingly, a user may interact with the spherical panoramic image to view a 360° view of the spherical panoramic image. In this regard, the user may select a feature or object, such as the Statue of Liberty, displayed in the spherical panoramic image. A spatial identifier associated with the portion of the spherical panoramic image selected by the user (e.g., the Statue of Liberty) may be provided to the server 5024 as navigation data 5042. The server 5024 may retrieve a plurality of images that include the spatial identifier provided by the client device in navigation data 5042. For instance, the plurality of images may include different images of the Statue of Liberty. The server 5024 may select a second image from one of the plurality of retrieved images and provide the second image to the client device 5002 as image file 5044. The client device may then display the second image, such as a spherical panoramic of the Statue of Liberty. Thus, the first image may be interconnected to the second image by virtue that the share a common object.

Figure 6:
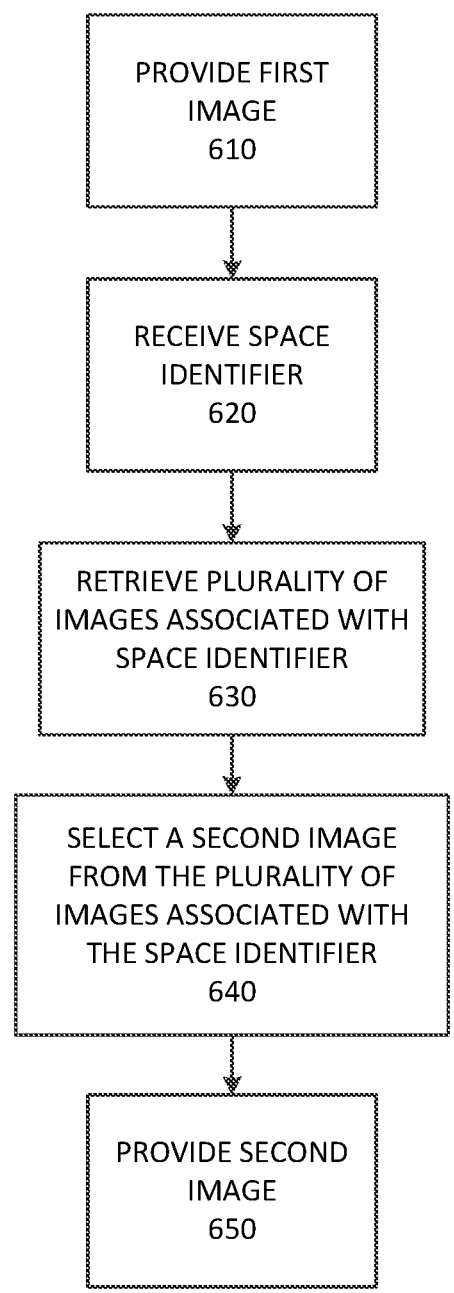
FIG. 6 illustrates a flowchart for determining the next image to display in response to receiving a user selection.

FIG. 6 illustrates a flowchart for selecting a second image in response to receiving an identifier. While the operations of FIG. 6 are discussed in a particular order, it should be understood that the order may be varied. Similarly operations may be performed simultaneously, and operations may be added or omitted.

In block 610, one or more servers may provide a first image to be displayed by one or more client devices as described above. The first image may be a panoramic image, a spherical panoramic, or a flat image. Additionally, the server may provide spatial identifiers for each pixel in the first image to the one or more client devices along with the first image. As discussed above, the server may perform batch processing to map each pixel in the first image to a spatial identifier.

The one or more client devices may receive the first image from the one or more servers and display the first image, such that a user of the client device may interact with the first image and select a portion of the first image. In response to a user-selection, the client device may determine a spatial identifier associated with the user-selected portion of the first image and transmit the spatial identifier to the one or more servers.

In block 620, the one or more servers may receive the spatial identifier from the one or more client devices. The one or more servers may then retrieve a plurality of images associated with the spatial identifier from a memory, as described above. The plurality of images may include images provided by mapping services or similar images in the public domain. Alternatively, the plurality of images may include user generated content. In this regard, user generated content may only be selected if the user viewing the first image is authorized to view the user generated content. Additionally, the plurality of images associated with the spatial identifier may include a scored listing of the plurality of images. In some examples, the plurality of images may include images at a higher level in the hierarchical tree of space. For instance, if the user-selection is in the background of the first image, the plurality of images may be at a higher level in the hierarchical tree of space to provide a wider selection of images associated with the selected spatial identifier.

In block 640, the one or more servers may select a second image from the plurality of images retrieved in block 630. In some examples, selecting a second image may include selecting an image based on the scored listing of the plurality of images. In other examples, selecting the second image may include determining whether the user is authorized to view user generated content. In block 650, the one or more servers may provide the second image to the one or more client devices. As with the first image, the user of the client device may interact with the second image much in the same way that the user interacted with the first image. Accordingly, the operations illustrated in FIG. 6 may be repeated for the second image and any subsequent images to provide a richer viewing experience.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including," and the like, should not be interpreted as limiting the subject matter of the claims to the specific examples; rather, the examples are intended to illustrate only one of many possible examples. Further, the same reference numbers in different drawings can identify the same or similar elements.

The invention claimed is:

1. A method comprising:
receiving, by one or more computing devices, a user selection of a first portion of a first image, the first portion capturing at least a portion of a surface of an object, wherein the first image is one of a plurality of images stored in a server;
determining, by the one or more computing devices, that the first portion of the first image is associated with a first spatial identifier associated with a three-dimensional (3D) model of geographic space, the first spatial identifier identifying a first cube in the 3D model and a second cube in the 3D model, wherein the first cube is contained within the second cube;
transmitting, by the one or more computing devices, the first spatial identifier to the server;
receiving, by the one or more computing devices, a second image from the server, the second image having a second portion that is associated with the first spatial identifier; and
providing, by the one or more computing devices, the second image for display on a display.

2. The method of claim 1, wherein the user selection includes clicking on the first portion of the first image.

3. The method of claim 1, wherein the first portion of the first image is a pixel of the first image.

4. The method of claim 1, wherein the second image is received in panorama tiles, and the second image is provided for display according to orientation information received from the server.

5. The method claim 1, wherein the first cube and the second cube are part of an octree associated with the 3D model, the octree having a root cube that encompasses the Earth, the root cube having a side length on an order of $2^{23}$ meters.

6. The method of claim 5, wherein the first spatial identifier is 78 bits.

7. The method of claim 1, wherein cubes in the lower level have a side length of about ⅛ meter.

8. A system comprising:
one or more computing devices;
a memory storing computer readable instructions of a program, wherein the instructions, when executed by the one or more computing devices, case the one or more computing devices to:
receive a user selection of a first portion of a first image, the first portion capturing at least a portion of a surface of an object, wherein the first image is one of a plurality of images stored in a server;
determine that the first portion of the first image is associated with a first spatial identifier associated with a three-dimensional (3D) model of geographic space, the first spatial identifier identifying a first cube in the 3D model and a second cube in the 3D model, wherein the first cube is contained within the second cube;
transmit the first spatial identifier to the server;
receive a second image from the server, the second image having a second portion that is associated with the first spatial identifier; and
provide the second image for display on a display.

9. The system of claim 8, wherein the user selection includes clicking on the first portion of the first image.

10. The system of claim 8, wherein the first portion of the first image is a pixel of the first image.

11. The system of claim 8, wherein the second image is received in panorama tiles, and the second image is provided for display according to orientation information received from the server.

12. The system of claim 8, wherein the first cube and the second cube are part of an octree associated with the 3D model, the octree having a root cube that encompasses the Earth, the root cube having a side length on an order of $2^{23}$ meters.

13. The system of claim 8, wherein cubes in the lower level have a side length of about ⅛ meter.

14. A non-transitory, tangible computer-readable storage medium on which computer readable instructions of a program are stored, the instructions, when executed by one or more computing devices, cause the one or more computing devices to perform a method, the method comprising:

receiving a user selection of a first portion of a first image, the first portion capturing at least a portion of a surface of an object, wherein the first image is one of a plurality of images stored in a server;

determining that the first portion of the first image is associated with a first spatial identifier associated with a three-dimensional (3D) model of geographic space, the first spatial identifier identifying a first cube in the 3D model and a second cube in the 3D model, wherein the first cube is contained within the second cube;

transmitting the first spatial identifier to the server;

receiving a second image from the server, the second image having a second portion that is associated with the first spatial identifier; and providing the second image for display on a display.

15. The medium of claim 14, wherein the user selection includes clicking on the first portion of the first image.

16. The medium of claim 14, wherein the first portion of the first image is a pixel of the first image.

17. The medium of claim 14, wherein the second image is received in panorama tiles, and the second image is provided for display according to orientation information received from the server.

18. The medium of claim 14, wherein the first cube and the second cube are part of an octree associated with the 3D model, the octree having a root cube that encompasses the Earth, the root cube having a side length on an order of $2^{23}$ meters.

19. The medium of claim 18, wherein the first spatial identifier is 78 bits.

20. The medium of claim 14, wherein cubes in the lower level have a side length of about ⅛ meter.

* * * * *